United States Patent Office 2,903,454
Patented Sept. 8, 1959

2,903,454
4-AMINOCHROMANES

Helmer Richter, Berlin-Grunewald, and Martin Schenck, Berlin-Frohnau, Germany, assignors to Firma Schering A.G., Berlin, Germany No Drawing. Application April 11, 1957
Serial No. 652,088

Claims priority, application Germany November 28, 1953

9 Claims. (Cl. 260—247.7)

The present invention relates to 4-aminochromanes and more particularly to a new series of compounds which are 4-aminochromanes that are substituted in at least the 8-position and which have valuable therapeutic properties particularly as local anaesthetics and as coronary blood vessel dilators.

This application is a continuation-in-part of our copending application Serial No. 470,818, filed November 23, 1954, for "4-Aminochromanes and Methods of Producing the Same," now abandoned.

It is an object of the present invention to provide a new series of compounds, namely 4-aminochromanes which have valuable therapeutic properties, particularly as local anaesthetics and as coronary blood vessel dilators.

It is another object of the present invention to provide methods of producing the new 4-aminochromanes of the present invention.

Other objects and advantages of the present invention would be apparent from a further reading of the specification and of the appended claims.

With the above objects in view, the present invention mainly comprises as a new composition of matter a 4-aminochromane having the following structural formula:

(I)
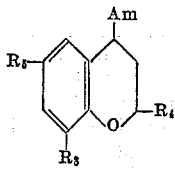

wherein Am is selected from the class consisting of the amino group, mono-substituted amino groups substituted by saturated and unsaturated alkyl radicals, di-substituted amino groups substituted by saturated and unsaturated alkyl radicals, and heterocyclic nitrogen-containing radicals, wherein $R_3$ is selected from the group consisting of alkyl, aryl and aralkyl radicals, wherein $R_4$ is selected from the group consisting of hydrogen and lower alkyl radicals, and wherein $R_5$ is selected from the group consisting of hydrogen and lower alkyl radicals.

The structural formula of the compounds of the present invention may also be written as follows:

(II)
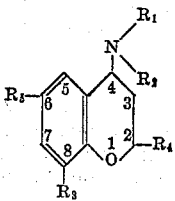

wherein $R_1$ is hydrogen or a saturated or unsaturated alkyl radical, $R_2$ is hydrogen or a saturated or unsaturated alkyl radical or $R_1$ and $R_2$ together with the N of the radical is a heterocyclic ring radical such as pyrrolidyl, piperidyl or morpholinyl.

$R_1$ and $R_2$ are preferably either hydrogen or lower saturated or unsaturated alkyl radicals such as methyl, ethyl, propyl, butyl, amyl, ethenyl, ethynyl, butenyl, and the like. The unsaturated alkyl radicals may also be referred to as alkenyl and alkynyl radicals.

Thus, Am includes among the suitable groups represented thereby, the amino group; mono alkyl amino groups such as methylamino, ethylamino, propylamino, isopropylamino and butylamino; secondary amino groups such as dimethylamino, diethylamino, di-n-propylamino, diisopropylamino, dibutylamino, or mixed dialkylamino groups such as methylethylamino, ethylpropylamino, methylbutylamino, and the like; and heterocyclic nitrogen-containing radicals such as pyrrolidino, piperidino, morpholino, oxazolidono, thiazolidino, piperazino and the like.

The substituent $R_3$ which is substituted in the benzol ring in the 8-position of the chromane system may be an alkyl, aryl or aralkyl radical. Preferably $R_3$ is a lower alkyl radical of up to 4 carbon atoms such as methyl, ethyl, propyl, butyl and the like, or an aryl radical such as phenyl, tolyl, xylyl, and the like, or an aralkyl radical such as benzyl, phenylethyl, tolylmethyl and the like.

$R_4$ may be a hydrogen atom in which case the 2-position of the chromane system which is in the hetero-ring is unsubstituted, or $R_4$ may be a lower alkyl radical of preferably not more than 4 carbon atoms, e.g. methyl, ethyl, propyl, isopropyl, and butyl.

Similarly, $R_5$ the substituent in the 6-position of the chromane system in the benzol ring may be hydrogen in which case the 6-position is unsubstituted, or it may be a lower alkyl radical of preferably not more than 4 carbon atoms.

According to the preferred embodiment of the present invention the compounds of the present invention are those compounds of structural Formula I above in which Am is selected from the class consisting of the amino group, mono-alkyl amino groups in which the alkyl group contains 1–4 carbon atoms, di-alkyl amino groups in which the alkyl groups contain 1–4 carbon atoms, and the morpholino radical, the piperidino radical and the pyrrolidino radical, $R_3$ is selected from the group consisting of lower alkyl radicals of up to 4 carbon atoms and the phenyl radical, $R_4$ is selected from the group consisting of hydrogen and lower alkyl radicals of up to 4 carbon atoms, and $R_5$ is selected from the group consisting of hydrogen and lower alkyl radicals of up to 4 carbon atoms, and acid addition salts thereof.

In addition to providing the new group of chemical compounds herein specified, the present invention also provides methods of producing the same. As will be seen, although all of the compounds mentioned may be separated as such, it is often more feasible to separate their acid addition salts such as the hydrochloride addition product of the compound rather than the pure compound itself, which acid addition product may be used per se if derived from a non-toxic acid or, if not, may be further treated to obtain the pure product. The present invention mainly comprises not only the above-specified compounds but also their acid addition products, preferably the addition products with non-toxic acids.

The substituted 4-aminochromanes of the present invention have an excellent action as coronary blood vessel dilators. Thus, the following compounds: 2,6,8-trimethyl-4-dimethylamino-chromane-hydrochloride, 8-phenyl-4-dimethylamino-chromane-hydrochloride, and 8-phenyl-4-diethylamino-chromane-hydrochloride have about two times the coronary blood vessel dilating action of the commonly used compound 5,8-dimethoxy-2-methyl-(furano-2′,3′:7,6-chromane) which is sold under the trade name "Khellin," while being much less toxic than "Khellin." The compound 8-phenyl-4-morpholino-chromane-hydrochloride of the present invention has three times the blood vessel dilating action of "Khellin" and is less than one tenth as toxic as "Khellin."

The compounds 2,6,8-trimethyl-4-dimethylamino-chromane - hydrochloride, 8 - phenyl - 4 - dimethylamino - chromane-hydrochloride, and 8-phenyl-4-diethylamino-chromane-hydrochloride also have a very marked local anaesthetic action which is actually superior to that of the well known compound "Novacain."

It is thus apparent that the compounds of the present invention have truly superior properties as coronary blood vessel dilators and as local anaesthetics. These compounds may be used for veterinary purposes, i.e. the treatment of animals, and the compounds may also be used in the treatment of humans.

It should also be noted that while the substituted 4-aminochromanes of the present invention have the above set forth superior blood vessel dilating and local anaesthetic properties, the unsubstituted 4-aminochromanes such as 4-dimethylamino-chromane-hydrochloride have no action either as blood vessel dilator or as local anaesthetic.

The process of the present invention preferably starts with the correspondingly substituted 4-chromanone having the following formula:

(III)

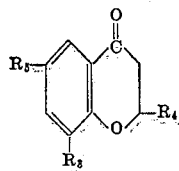

According to one embodiment of the present invention, the 4-chromanone is reduced to the corresponding 4-chromanol having the following formula:

(IV)

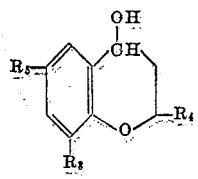

and then by treatment with an inorganic acid halogenide such as thionylchloride is converted to the corresponding 4-halogen-chromane. This substance is then treated with ammonia, a primary amine, a secondary amine or a heterocyclic nitrogen-containing compound to form the desired aminochromane.

According to a further embodiment of the present invention the products thereof may be produced by converting the 4-chromanone into its oxime, e.g. by reaction of the 4-chromanone with hydroxylamine, and then catalytically hydrogenating the oxime to produce primary 4-aminochromane. If this is the desired product, it may be purified and recovered. If desired, the amino group may be by normal N-alkylation converted to form the desired secondary or tertiary 4-amino-chromane.

It is also possible to produce the product of the present invention starting from 4-chromanone by reductive amination, for example by catalytic hydrogenation in the presence of ammonia or a correspondingly chosen primary or secondary amine. The desired 4-aminochromane is directly obtained in this manner. Obviously, it is possible with any of the above-described processes to subject the obtained primary or secondary 4-aminochromane to customary alkylation methods in order to further alkylate in the amino group.

The process of producing the products of the present invention by reducing 4-chromanone to 4-chromanol as described above may be varied by directly reducing the correspondingly substituted 4-chromone of the following formula:

(V)

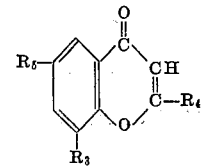

to the 4-chromanol without separating the intermediately produced 4-chromanone. The thus obtained 4-chromanol is then treated as above-described with an inorganic acid halogenide to form the corresponding 4-halogen-chromane and then further treated with ammonia, a primary amine, a secondary amine, or a nitrogen-containing heterocyclic compound to produce the final product.

The following examples are given as illustrative of the present invention, the scope of the invention not, however, being limited to the specific details of the examples.

*Example 1*

6.25 g. of 8-phenyl-4-chromanone (melting point 65°–67° C., produced for example from o-oxydiphenyl and β-halogen-propionic acid by way of the acid chloride of phenyl-phenoxypropionic acid by means of a Friedel-Crafts type reaction) is hydrogenated under normal conditions in 50 cc. of methanol in the presence of Raney nickel. After suctioning off the catalyst, the filtrate is dried. The raw chromanol (6.3 g.) is directly further worked up. 6.3 g. of the raw chromanol is dissolved in 25 cc. of chloroform and reacted at room temperature with 4.1 g. of thionyl chloride dissolved in 5 cc. of chloroform. This is then left for 2½ hours at 50° C.

The solvent and excess thionyl chloride are evaporated under vacuum. The residue is taken up in ether. The ether solution is successively washed with water, bicarbonate solution and water and dried over sodium sulfate. The ether is evaporated and the residue subsequently dried over phosphorus pentoxide. The yield is 7.2 g. of chlorchromane (as a yellow oil).

7.2 g. of the raw chlorchromane is mixed in a pressure flask with 15 cc. of dimethylamine and allowed to stand at room temperature overnight. The reaction mixture is taken up in water and ether. It is then washed with water until neutral, dried over potassium carbonate and subsequently precipitated as hydrochloride of 4-dimethylamino-8-phenyl-chromane by treatment with ethereal hydrogen chloride. After crystallization from methanol-ether the melting point is found to be 230°–231.5° C. The yield of the re-crystallized compound, 5.3 g., is 65% of the theoretical. By further working up of the mother liquor, the yield can be further increased.

*Example 2*

3.6 g. of 8-phenyl-4-chromanone-oxime having a melting point of 194°–197° C., produced by treating 8-phenyl-4-chromanone with hydroxylamine hydrochloride in pyridine-alcohol, in 50 cc. of methanol which contains 1.65 g. of hydrogen chloride is hydrogenated with palladium carbon catalyst. The utilized catalyst is produced by precipitating palladium in known manner on a suspension of carbon in 0.5 cc. of aqueous sodium acetate solution, (palladium content—10% to 15%). The taking up of hydrogen takes about 7 hours and amounts to 0.92 mol. The catalyst is then suctioned off and the filtrate is reduced under vacuum to ⅓ of its volume. The addition of ether results in the precipitation of the hydrochloride of 8-phenyl-4-aminochromane which is re-precipitated from methanol-ether and is found to have a melting point of 233°–235° C.

*Example 3*

5.2 g. of raw 8-phenyl-4-chlorchromane (produced according to Example 1) is reacted with 13 cc. of water-free diethylamine at 80° C. in a bomb tube. After opening the tube, the reaction mixture is taken up in ether and water. The ether solution is washed with water until neutral and subsequently dried over potassium carbonate. The hydrochloride of the 8-phenyl-4-diethylaminochromane is precipitated by means of ethereal hydrochloric acid. It is then re-crystallized from ethanol-ether. The yield is 4.3 g., and the melting point 210°–212° C.

Example 4

10 g. of 8-phenyl-4-aminochromanehydrochloride is reacted with 12 g. of 90% formic acid as well as 8.5 g. of 40% formalin solution and heated on a steam bath until the development of carbonic acid ceases. After the addition of several drops of concentrated hydrochloric acid, the volume of the reaction solution is reduced under vacuum. The residue is taken up with water and decolorized with carbon. The base is precipitated by the addition of sodium carbonate solution and is taken up in ether. After the addition of ethereal hydrochloric acid the hydrochloride of 8-phenyl-4-dimethylaminochromane is precipitated. It is re-crystallized from methanol-ether and has a melting point of 230°–231.5° C. The base which is set free from the hydrogen chloride by means of sodium carbonate solution has a melting point after re-crystallization from benzene of 96°–98.5° C.

Example 5

17 g. of 4-chloro-8-phenylchromane is heated to a temperature of 70° C. for several hours in a pressure tube with an excess of ethylamine. The contents of the tube are then taken up in water and ether. The ether solution is washed with water until neutral. The 4-ethylamino-8-phenylchromane is extracted with aqueous hydrochloric acid and the base is subsequently precipitated with sodium carbonate solution. The base is in turn taken up with ether. After drying the ether solution over potassium carbonate, the base is isolated by evaporation of the carbon.

The extracted base is mixed in methanol solution with the calculated amount of tartaric acid (½ mol tartaric acid per 1 mol of base). The evaporation residue is crystallized by rubbing with ether. After precipitation from chloroform-ether, the 4-ethylamino-8-phenylchromane-tartrate after previous softening melts at 119° C. with decomposition. In a similar manner the corresponding hydrochloride may be obtained from the base by precipitation with ethereal hydrochloric acid. The hydrochloride has a melting point of 185°–187° C.

Example 6

11.2 g. of 8-phenylchromanone-(4) is dissolved in 50 cc. of methanol and reacted with 6.8 g. of ethylamine. With the application of Raney nickel as catalyst the aminating hydrogenation follows under normal conditions. After the hydrogenation has reached completion the catalyst is separated from the filtrate and the volume of the filtrate is reduced under vacuum. The residue is taken up in ether. Ethereal hydrochloric acid is added to the filtered solution whereby the basic portion precipitates as the hydrochloride. It is now possible to obtain the 8-phenyl-4-ethylaminochromanehydrochloride mentioned in Example 5 in pure state by fractional precipitation of the free base by means of alkali and renewed reaction of the oily fractions with ethereal hydrochloric acid.

Example 7

4.5 g. of raw 2,6,8-trimethylchromanone-(4), produced from 4.4 g. of 2,6,8-trimethylchromone-(4) (melting point 129°–130° C.), by hydrogenation with Raney nickel as catalyst and interrupting the reaction after 1 mol of $H_2$ is taken up, is again hydrogenated in methanol under normal conditions using Raney nickel as catalyst, whereby 2,6,8-trimethylchromanol-(4) having a melting point of 115°–116° C. is obtained. The yield is 3.8 g. of the re-crystallized product. The hydrogenation of the chromone to the chromanol can also be carried out in a single proceeding under the same reaction conditions.

3.8 g. of the thus obtained 2,6,8-trimethylchromanol-(4) is reacted at room temperature with 2.7 g. of thionylchloride in chloroform and then warmed for several hours at 50° C. The reaction liquid is evaporated in vacuum and the residue taken up in ether. It is then washed successively with water, sodium bicarbonate solution and water. The ether solution is dried over sodium sulfate, evaporated under vacuum and the residue dried in a desiccator over phosphorous pentoxide.

The thus obtained raw chloride is then directly again reacted with dimethylamine (5 g.) in a pressure flask. It is allowed to stand overnight at room temperature and the reaction mixture is then taken up in water and ether. The ether solution is washed with water until neutral and dried over potassium carbonate which has been previously dried by heating to glowing. The solution is then concentrated by evaporation and the hydrochloride of the 2,6,8-trimethyl-4-dimethylaminochromane is then precipitated with ethereal hydrochloric acid. The melting point of the raw chloride is 222°–224° C. The substance may be recrystallized from a methanol-ether and the melting point is 225° C.

The necessary starting material for this example, namely the hitherto not described 2,6,8-trimethylchromone-(4) having a melting point of 129°–130° C. can be obtained for example from 1,3,4-xylenol through the 2-oxy-3,5-dimethylacetophenone having a melting point of 57°–58° C. and further reaction with acetic ester according to known methods:

(1) By reaction of 1,3,4-xylenols with acetic ester and phosphorous oxychloride to the phenol ester and subsequent Fries rearrangement according to V. Auwers, Ber. dtsch. chem. Ges., 54,1553, (further literature—Willig, Ber. dtsch. chem. Ges., 57, 89, and Rosenmund, Liebigs. Ann. Chem. 460, 83), and (2) Further reaction to chromone according to L. Vargha, Acta chim. acad. sci. Hung., 3, 223–228 (53).

The following equations illustrate the reaction mechanism of forming the 2,6,8-trimethylchromone-(4):

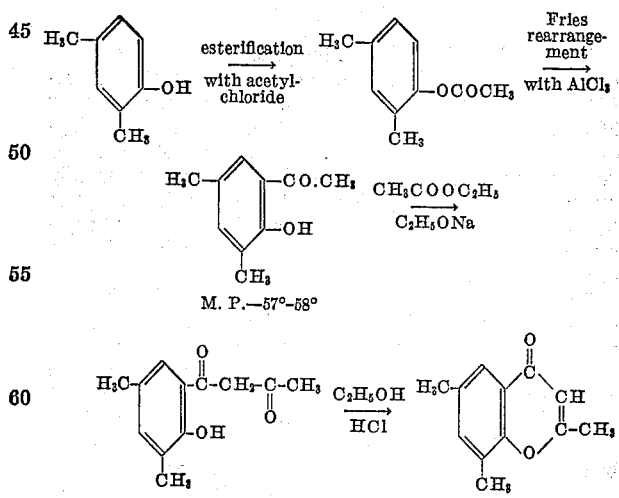

Example 8

7.5 g. of crude 8-phenylchromanol-(4), produced according to Example 1, are dissolved in alcohol-free, dry chloroform and mixed with 9 g. of phosphorous tribromide. The mixture is warmed for one and one half hours at 50° C. while excluding moisture and, after pouring off the phosphoric acid, the chloroform and excess phosphorous tribromide are distilled-off in vacuum. The residue is then left overnight in a vacuum desiccator over phosphorous pentoxide and potassium hydroxide.

The thus obtained crude 8-phenyl-4-bromochromane is dissolved in 25 cc. of benzene and the solution is mixed under cooling with excess pyrrolidine. The reaction mixture is left standing overnight at room temperature and the temperature is then increased to 60° C. for one and one half hours. The reaction mixture is taken up in water and ether, the solution washed to neutral with water and dried over potassium carbonate which had been heated to the glow temperature. By the addition of ethereal hydrochloric acid to the dry ether solution the hydrochloride of 8-phenyl-4-pyrrolidinechromane is precipitated. The melting point of the hydrochloride after precipitation from methanol-ether is 234°–237° C. The yield corresponds to 70% of the theoretical calculated on the crude 8-phenylchromanol-(4).

*Example 9*

The production of 8-phenyl-4-bromochromane from 25 g. of crude 8-phenylchromanol-(4) proceeds as in Example 8. The thus obtained crude 8-phenyl-4-bromochromane is dissolved in 75 cc. of benzene and the solution is slowly reacted with 35 g. of morpholine under cooling. The reaction mixture is allowed to stand overnight while excluding moisture and it is then heated for one and one half hours at 60° C. The reaction mixture is taken up in water and ether. The ether solution is washed with water until neutral and it is then extracted with dilute hydrochloric acid. The purified hydrochloric acid extract is washed several times with ether, filtered over decolorizing carbon and the 8-phenyl-4-morpholinochromane is precipitated from the clear hydrochloric acid filtrate with sodium carbonate solution.

The base is then extracted with chloroform and the solution is dried over potassium carbonate which had been heated to glowing. The hydrochloride of the 8-phenyl-4-morpholinochromane is precipitated by means of ethereal hydrochloric acid from the filtered chloroform solution after bringing the solution to a small volume by evaporation. The yield is 47% of the theoretical, calculated on the crude 8-phenylchromanol-(4). The hydrochloride can be reprecipitated from methanol-ether. The melting point thereof is 206°–209° C.

*Example 10*

3.5 g. of crude, oily 8-ethylchromanone-(4) are hydrogenated in methanol solution to 8-ethylchromanol-(4) with Raney nickel as catalyst in an autoclave under 200 atmospheres pressure and 100° C. After suctioning-off of the catalyst and evaporation of the solvent under vacuum the 8-ethylchromanol-(4) is obtained as an oily residue. The yield is 3.3 g. The testing for complete hydrogenation is done by means of 2,4-dinitrophenylhydrazine. The reagent gives no keto reaction with the oily hydrogenation product.

3.3 g. of the crude 8-ethylchromanol-(4) is mixed at room temperature with 1.8 g. of phosphorous tribromide and 10 cc. of alcohol-free and water-free chloroform, and the mixture is then warmed to 50° C. for one and one half hours. The reaction liquid is cooled and then mixed with ice water, the chloroform layer is separated in a separatory funnel and washed successively with water, bicarbonate solution and water. The chloroform solution is then dried over calcium chloride and evaporated under vacuum.

The residue is mixed with 15 cc. of diethylamine and allowed to stand at room temperature for 48 hours while excluding moisture. The precipitated diethylamine hydrobromide is filtered-off by suction and the excess diethylamine is distilled-off from the filtrate. The residue is taken up in water and ether. The ether solution is washed to neutral with water and dried over potassium carbonate which had been heated to glowing. The addition of ethereal hydrochloric acid to the dried ether solution results in the immediate precipitation of the pure hydrochloride of 8-ethyl-4-diethylaminochromane, having a melting point of 157°–160° C.

The 8-ethylchromanone-(4) which is needed as the starting material can be produced from o-ethylphenol by conversion with β-chloropropionic acid and ring closure according to known methods.

*Example 11*

7.1 g. of 2,6,8-trimethylchromanol-(4) are dissolved in dry, alcohol-free chloroform and mixed with 10.4 g. of phosphorous tribromide. The mixture is warmed at 50° C. for one and one half hours excluding moisture and, after pouring-off of the separated phosphoric acid, the chloroform and excess phosphorous tribromide are distilled-off under vacuum. The residue is kept for a day in a vacuum dessicator over phosphorous pentoxide and potassium hydroxide. The thus obtained 2,6,8-trimethyl-4-bromochromane is mixed under cooling with excess piperidine which at the same time acts as solvent, and allowed to stand overnight at room temperature. The reaction mixture is then heated for one and one half hours at 50°–60° C. and is subsequently taken up in ether and water. The ether solution is washed with water until neutral and dried over potassium carbonate which had been heated to glowing. The hydrochloride of the 2,6,8-trimethyl-4-piperidinochromane is precipitated by the addition of ethereal hydrochloric acid to the dried ether solution. The melting point of the hydrochloride is 237°–238° C. The yield corresponds to 75% of the theoretical, calculated on the utilized 2,6,8-trimethylchromanol-(4).

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. As a new composition of matter, a 4-aminochromane selected from the group consisting of 4-aminochromanes having the following structural formula:

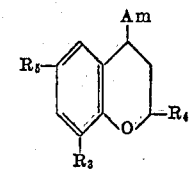

wherein Am is selected from the class consisting of the amino group, mono-alkyl amino groups in which the alkyl group contains 1–4 carbon atoms, di-alkyl amino groups in which the alkyl groups contain 1–4 carbon atoms, and the morpholino radical, the piperidino radical and the pyrrolidino radical; wherein $R_3$ is selected from the group consisting of lower alkyl radicals of up to 4 carbon atoms and the phenyl radical; wherein $R_4$ is selected from the group consisting of hydrogen and lower alkyl radicals of up to 4 carbon atoms; and wherein $R_5$ is selected from the group consisting of hydrogen and lower alkyl radicals of up to 4 carbon atoms; and acid addition salts thereof.

2. As a new composition of matter, 2,6,8-trimethyl-4-dimethylamino-chromane.

3. As a new composition of matter, 8-phenyl-4-dimethylamino-chromane.

4. As a new composition of matter, 8-phenyl-4-diethylamino-chromane.

5. As a new composition of matter, 8-phenyl-4-morpholino-chromane.

6. As a new composition of matter, 8-phenyl-4-pyrrolidinochromane.
7. 8-phenyl-4-ethylamino-chromane.
8. 8-ethyl-4-diethylamino-chromane.
9. 2,6,8-trimethyl-4-piperidino-chromane.

References Cited in the file of this patent

Bachman et al.: Jour. Amer. Chem. Soc. (1948), vol. 70, pp. 559–601.

Gabert: Compt. Rend. (1952), vol. 235, pp. 1407–1408.